(12) United States Patent
Sobczak et al.

(10) Patent No.: US 6,966,426 B1
(45) Date of Patent: Nov. 22, 2005

(54) METHOD AND APPARATUS FOR INTEGRATING A PALLET INTO A CONVEYOR SYSTEM

(76) Inventors: Brian Sobczak, 916 Dickson La., Rochester Hills, MI (US) 48307; Don Clos, 17334 Castle, Roseville, MI (US) 48066; Ron Brown, 883 Bernie La., Madison Heights, MI (US) 48071

( * ) Notice: Subject to any disclaimer, the term of this patent is extended or adjusted under 35 U.S.C. 154(b) by 71 days.

(21) Appl. No.: 10/665,636

(22) Filed: Sep. 20, 2003

(51) Int. Cl.[7] ............................................. B65G 47/04
(52) U.S. Cl. ............................... 198/465.3; 198/465.1; 198/460.1; 198/579
(58) Field of Search ......................... 198/465.3, 460.1, 198/461.1, 576, 577, 579, 795, 465.1

(56) References Cited

U.S. PATENT DOCUMENTS

| | | | | |
|---|---|---|---|---|
| 3,650,373 A | * | 3/1972 | Kern et al. | 198/465.1 |
| 3,690,433 A | * | 9/1972 | Buldini | 198/465.3 |
| 4,925,005 A | * | 5/1990 | Keller | 198/460.1 |
| 5,085,059 A | * | 2/1992 | Grigoli et al. | 198/465.3 |
| 6,315,104 B1 | * | 11/2001 | Ebert | 198/460.1 |
| 6,626,282 B1 | * | 9/2003 | Nishizawa et al. | 198/795 |

* cited by examiner

*Primary Examiner*—James R. Bidwell
(74) *Attorney, Agent, or Firm*—Young & Basile, P.C.

(57) ABSTRACT

A method and apparatus for integrating a new or transferred pallet into a conveyor system. The present invention provides a first conveyor for carrying a plurality of adjacently aligned pallets along a predetermined path of travel. A first motor is coupled to the first conveyor for driving the adjacently aligned pallets at a first rate of speed. A first encoder is coupled to the first motor for monitoring the position of the last pallet of the adjacently aligned pallets on the first conveyor. A second conveyor carries and introduces a new pallet to the first conveyor. A second motor is coupled to the second conveyor for driving the new pallet at a second rate of speed, and a second encoder is coupled to the second motor for monitoring the position of the new pallet. A computer processor determines the relative positions of the last pallet relative to the new pallet for determining the second rate of speed of the new pallet so as to adjacently align the new pallet and the last pallet within a predetermined docking area. A controller adjusts the second rate of speed of the second motor in response to a signal from the computer processor.

17 Claims, 4 Drawing Sheets

METHOD AND APPARATUS FOR INTEGRATING A PALLET INTO A CONVEYOR SYSTEM

FIELD OF THE INVENTION

The present invention relates to a conveyor system, and more particularly, a method and apparatus for integrating a new or transferred pallet onto a conveyor of adjacently aligned end-to-end pallets.

BACKGROUND OF THE INVENTION

Today's industrial assembly lines have become highly integrated and complex. For instance, the automotive industry now utilizes conveyor lines that carry individual automobile bodies on individual pallets called skillets. These skillets have large platforms that extend beyond the width and length of the automobile body so that automotive assemblers may stand on the skillets and assemble a portion of the automobile body while the skillets are moving with the conveyor line.

A tremendous amount of technology has been implemented into these skillets and their associated conveyor systems. For instance, lifts may be provided on the skillets to allow for the raising and lowering of the automobile body relative to the position of the assembler so as to provide the optimum ergonomic position for the assembler. In addition, the skillets may contain barcode information to provide the assembler information regarding the automotive body prior to or during the assembly of the automotive body.

Although such technology is responsible for a number of advancements with regard to such assembly lines, problems still arise regarding the maneuverability of such skillets. Due to the size of the skillets and the fact that one main drive is typically utilized to drive the entire conveyor line of skillets by pushing the skillets end to end, it is difficult, if not impossible, to curve or bend the conveyor line. Therefore, the conveyor lines are typically straight. Since a conveyor line cannot continue straight throughout the entire assembly operation, the skillets must be transferred to different conveyor lines wherein they will again proceed along a substantially straight line. When transferring these skillets from one conveyor line to another, the skillets may be transferred underground or overhead. By transferring the skillets underground or overhead, valuable floor space is maximized in the plant.

When the skillets are transferred from a first conveyor line to a second conveyor line, the transferred skillets must be integrated onto the subsequent conveyor line such that the transferred skillet does not affect the flow of the skillets on the subsequent conveyor line. If while integrating the transferred skillet onto the subsequent conveyor line the transferred skillet bumps the last skillet on the conveyor line, a chain reaction may be created throughout the conveyor line, thereby causing the assembly line workers to lose their balance while standing on the skillets. In addition, the transferred skillet must become adjacently aligned with the last skillet prior to being driven by the main drive which drives the entire conveyor line. If this does not occur, a gap will occur between the transferred skillet and the last skillet thereby causing the two skillets to collide or bump at some point. In addition, integration of the transferred skillet must be done as fast as possible to maintain the efficiency of the assembly line.

Lastly, many conveyor lines have secondary conveyor lines that feed pallets, workpieces, or parts to the primary conveyor line. Since these secondary conveyors must be synchronized with the primary conveyor, the speed of one conveyor cannot be adjusted without adjusting the speed of the other conveyor lines. This creates inefficiencies when changing the speed of the conveyors. Such inefficiencies are undesirable in an industrial environment.

It is desirable to provide a method and apparatus for integrating a new or transferred pallet onto a conveyor such that the new or transferred pallet does not bump the existing pallets in the assembly line. In addition, it is desirable to provide a method and apparatus for integrating a new or transferred pallet onto an existing conveyor line at a highly efficient rate. Lastly, it is desirable to provide a method and apparatus for integrating a new or transferred pallet onto an existing conveyor that allows for the adjustment of the speed of the conveyor lines while the conveyor lines are running.

SUMMARY OF THE INVENTION

The present invention relates to a method and apparatus for integrating a new or transferred pallet onto a conveyor system. The apparatus provides a first conveyor for carrying a plurality of pallets end-to-end along a predetermined path of travel. A first motor is coupled to the first conveyor for driving the pallets at a first rate of speed. A first encoder is coupled to the first motor for monitoring the position of the last pallet on the first conveyor. A second conveyor is provided for introducing a new or transferred pallet to the first conveyor. A second motor is coupled to the second conveyor for driving the new or transferred pallet at a second rate of speed. A second encoder is coupled to the second motor for monitoring the position of the new pallet. A computer processor determines the relative positions of the last pallet on the first conveyor relative to the new or transferred pallet on the second conveyor. The computer processor also determines the second rate of speed in order for the new or transferred pallet to become adjacently aligned with the last pallet within a predetermined docking area. A controller adjusts the second rate of speed of the second motor in response to a signal from the computer processor.

The method of the present invention includes providing and driving a plurality of end-to-end pallets at a first rate of speed. A new or transferred pallet is introduced at a position spaced from the adjacently aligned end-to-end pallets. The new pallet is driven at a second rate of speed. The position of the new pallet is monitored relative to the position of the last pallet. The second rate of speed is adjusted based on the relative position of the new pallet to the last pallet so that the new pallet eventually travels at the first rate of speed and becomes adjacently aligned with the last pallet within a predetermined docking area.

BRIEF DESCRIPTION OF THE DRAWINGS

The description herein makes reference to the accompanying drawings wherein like reference numerals refer to like parts throughout several views, and wherein.

DESCRIPTION OF THE PREFERRED EMBODIMENT

Figure 1:
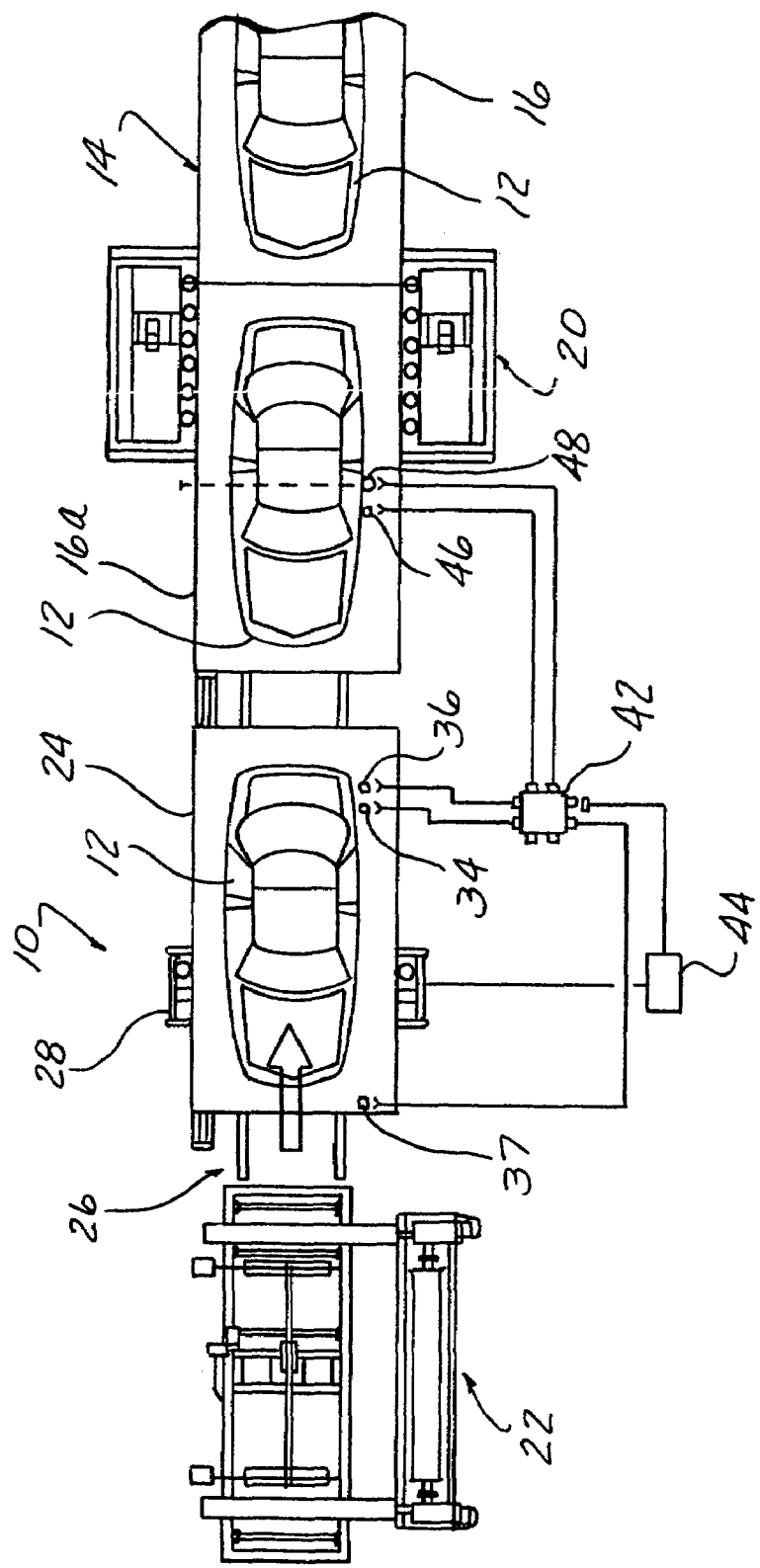
FIG. 1 is a schematic diagram showing the first and second conveyor lines of the present invention.

Referring to the drawings, the present invention will now be described in detail with reference to the disclosed embodiments.

FIG. 1 illustrates an apparatus 10 for integrating a new or transferred pallet or skillet 24 onto a first conveyor 14. The conveyor 14 carries and directs a plurality of skillets 16 along a predetermined path of travel. The skillets 16, 24, in turn, hold a workpiece 12, such as a motor vehicle body. The skillets 16 are adjacently aligned end-to-end on the conveyor 14 wherein the entire conveyor line 14 of skillets 16 is driven by a main drive 20 at a first rate of speed. The main drive 20 drives a last skillet 16a of the adjacently aligned skillets 16 on the conveyor 14 such that the last skillet 16a pushes the remaining adjacently aligned skillets 16 along the predetermined path of travel.

To introduce the new or transferred skillets 24 to the first conveyor 14, a lift or elevator 22 is utilized to lift the new skillet 24 from an underground conveyor or transportation system (not shown) which transfers the skillets 24 between adjacent conveyor lines (not shown). The lift 22 raises the new or transferred skillet 24 to the same level as the first conveyor 14, and the new skillet 24 is moved onto a short second conveyor line 26 that carries and directs the new skillet 24 along a predetermined path that is coaxial with a longitudinal axis of the first conveyor 14. A second motor or variable drive 28 drives the new skillet 24 along the second conveyor 26 at a second rate of speed. The second rate of speed is initially higher than the first rate of speed so that the new skillet 24 can advance toward the last skillet 16a on the first conveyor 14 and become adjacently aligned with the last skillet 16a within a predetermined docking area 30.

Figure 2A:
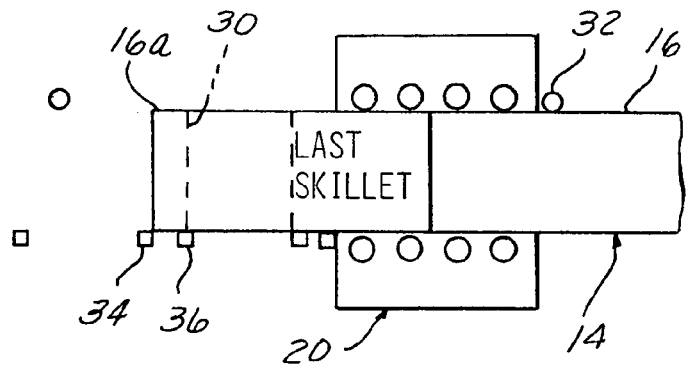
FIGS. 2a–2f are schematic diagrams showing the sequential steps of the last and new skillets of the present invention.
Figure 2B:
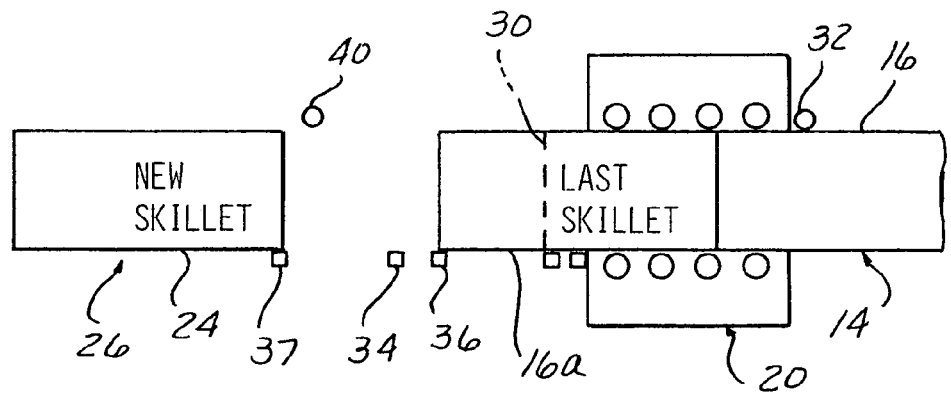

In order to monitor the position of the last skillet 16a on the first conveyor 14, a first encoder 32 is coupled to the main drive 20. The first encoder 32 counts the revolutions of the main drive 20, thereby providing an indication of how far the main drive 20 has driven or pushed the adjacently aligned skillets 16. When the last skillet 16a on the first conveyor 14 passes a sensor 34 at the first rate of speed, as seen in FIG. 2a, the first encoder 32 is reset to zero. As the last skillet 16a on the first conveyor 14 continues to travel at the first rate of speed, the last skillet 16a passes a sensor 36 which is located at the start of the docking area 30, as seen in FIG. 2b. When the last skillet 16 passes sensor 36, the new or transferred skillet 24 is released onto the second conveyor 26 at position 37. The last skillet 16a continues to travel on the first conveyor 14 at a first rate of speed, and the first encoder 32 continues to track the position of the last skillet 16a on the first conveyor 14.

Figure 2C:
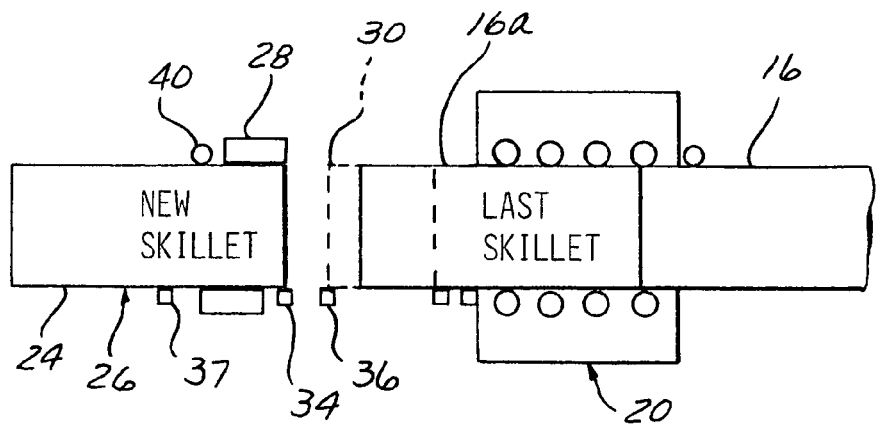

As the new skillet 24 travels along the second conveyor 26 at the second rate of speed, a second encoder 40 is reset to zero when the new skillet 24 reaches sensor 34, as seen in FIG. 2c. The second encoder 40 is coupled to the main or variable drive 28 and monitors the position of the new skillet 24 by counting the rotations of the variable drive 28.

Figure 2D:
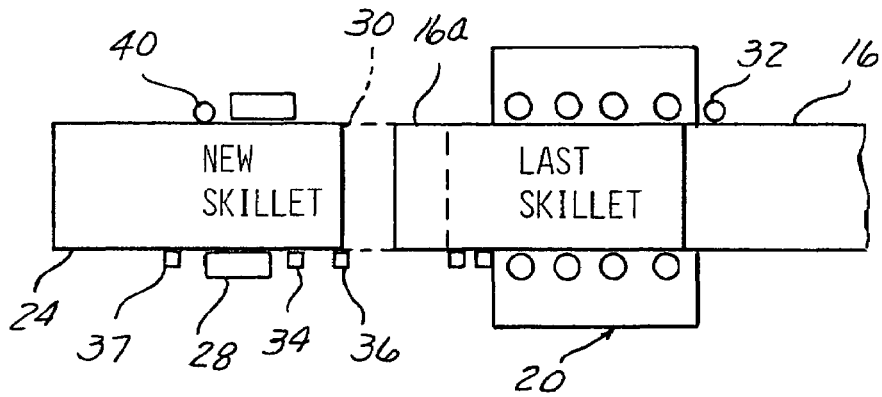

To gradually align the new skillet 24 with the last skillet 16a of the first conveyor 14, a computer processor 42, as seen in FIG. 1, analyzes the positions of the new skillet 24 and the last skillet 16a to determine the second rate of speed necessary for the new skillet 24 to become adjacently aligned with the last skillet 16a while both the new skillet 24 and the last skillet 16a are within the docking area 30. Once the new skillet 24 engages sensor 34, as seen in FIG. 2d, the computer processor 42 calculates a deceleration ramp through the following equation:

RAMP=((SECOND RATE OF SPEED)−(FIRST RATE OF SPEED))/((POSITION OF THE LAST SKILLET)−(POSITION OF THE NEW SKILLET))

Once the deceleration ramp is calculated, the speed of the new skillet 24 is continuously calculated through the following equation:

SPEED OF NEW SKILLET=(RAMP ((POSITION OF THE LAST SKILLET)−(POSITION OF THE NEW SKILLET))+SPEED OF THE LAST SKILLET)

Figure 2E:
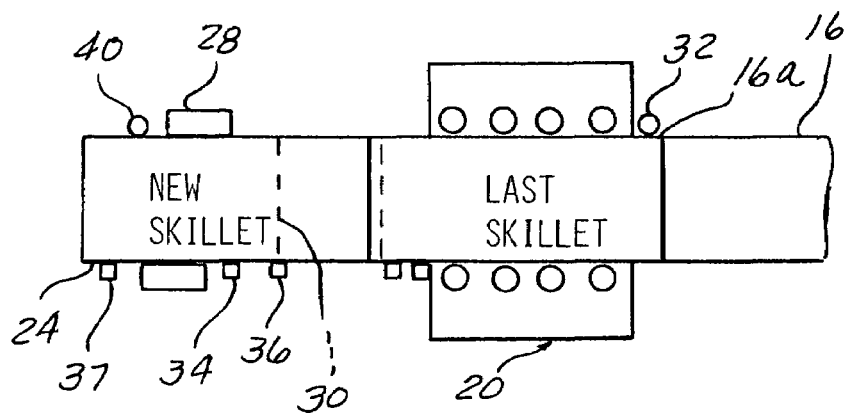

The computer processor 42 sends a signal to a controller 44, as seen in FIG. 1, indicating the desired speed for the new or transferred skillet 24. The controller 44 is coupled to and adjusts the variable drive 28 to correspond with the desired speed of the new or transferred skillet 24 as determined by the computer processor 42. Therefore, as the distance between the new or transferred skillet 24 and the last skillet 16a gets smaller, the speed of the new or transferred skillet 24 approaches the speed of the last skillet 16a, until the new skillet 24 and the last skillet 16a touch, as seen in FIG. 2e. When the skillets 16a, 24 touch or become adjacently aligned, the position of the last skillet 16a and the position of the new skillet 24 will equal zero, thereby leaving the speed of the last skillet 16a, the first rate of speed, to equal the speed of the new skillet 24, the second rate of speed. By providing constant updates as to the speed of the new skillet 24 by the computer processor 42, the speed of the first conveyor 14 can be changed to any rate and may be changed at any time during the production and running of the first conveyor 14. Once the new skillet 24 passes sensor 34, the new skillet 24 is considered integrated onto the first conveyor 14, and the new skillet 24 then becomes the last skillet 16a.

In order to integrate and adjacently align the new skillet 24 with the last skillet 16a of the first conveyor 14 within the docking area 30, the new skillet 24 maintains a predetermined upper level of the second rate of speed until the new skillet 24 reaches the start of the docking area 30. The docking area 30 is the shortest deceleration distance possible for the application based on the mechanical capabilities of the associated motors and gear boxes of the variable drive 28. Therefore, deceleration of the new skillet 24 does not begin until the new skillet 24 reaches the docking area 30. This is monitored by the computer processor 42 making the following calculations:

If (POSITION OF LAST SKILLET−POSITION OF NEW SKILLET) is greater than the minimum docking distance 30;

then (SPEED OF THE NEW SKILLET)=(UPPER LEVEL OF THE SECOND RATE OF SPEED);

otherwise, (SPEED OF THE NEW SKILLET)=(RAMP× (POSITION OF THE LAST SKILLET−POSITION OF NEW SKILLET)+SPEED OF THE LAST SKILLET)

Figure 2F:
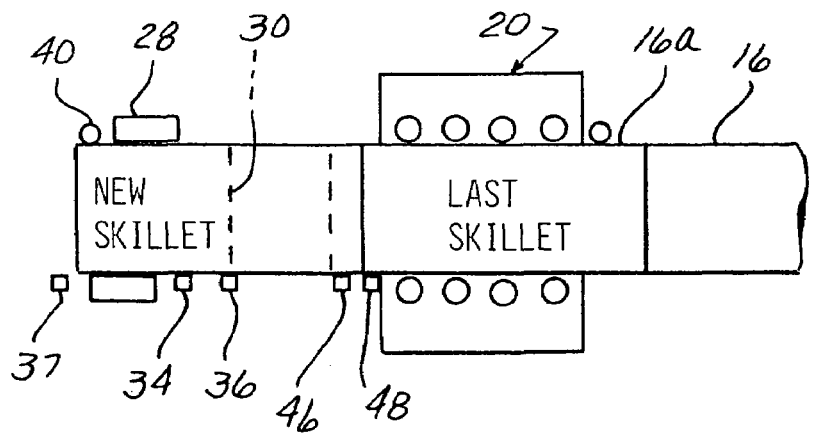

To prevent a gap from being created between the last skillet 16a and the new skillet 24, the new skillet 24 is integrated into the first conveyor 14 and will stop if it does not immediately engage a sensor 46 located at the end of the docking area 30. When the new skillet 24 reaches sensor 46, as seen in FIG. 2f, the new skillet 24 should be adjacently aligned with the last skillet 16a, and therefore, sensor 46 should be continuously actuated by the skillets 16a, 24. If sensor 46 is not actuated by the new skillet 24, the new skillet 24 is stopped so as to prevent the ramming or bumping of new skillet 24 into the last skillet 16a. A backup system is provided in a sensor 48 which is located further downstream the first conveyor 14 from sensor 46. If sensor 48 becomes exposed, a fault is generated and indicated to the user that the new skillet 24 is not properly aligned with the last skillet 16a.

Figure 3:
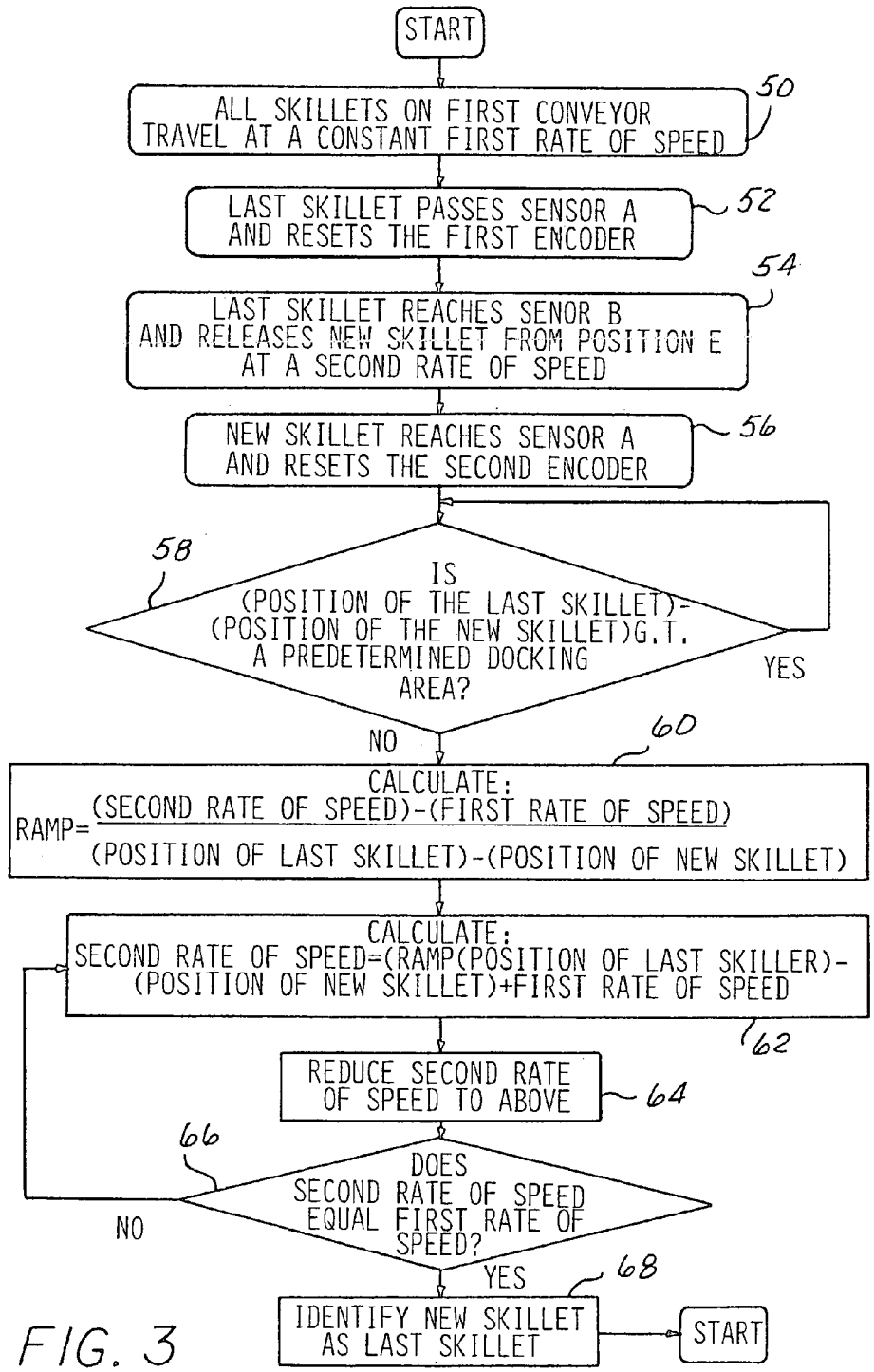
FIG. 3 is a flow chart showing the steps of integrating a new skillet onto a conveyor of the present invention.

FIG. 3 shows the steps of integrating the new skillet 24 onto the first conveyor 14. In operation, the first conveyor 14 of skillets 16 progresses forward at the first rate of speed, as seen in block 50, as assemblers assemble the workpieces 12 on the skillets 16. The last skillet 16a passes sensor 34 and resets the first encoder 32, as seen in block 52. The new skillet 24 is introduced to the first conveyor 14 through the lift 22. When the last skillet 16a reaches sensor 36, the new skillet 24 is released from position 37, as stated in block 54. The new skillet 24 moves along the second conveyor 26 at the highest second rate of speed possible or at a predetermined upper level of the second rate of speed. When the new skillet 24 reaches sensor 34, the second encoder 40 is reset to zero, as stated in block 56. As the new skillet 24 continues to travel and reach the beginning of the docking area 30, the computer processor 42 begins to calculate the second rate of speed of the new skillet 24 required for the new skillet 24 to become adjacently aligned with the last skillet 16a within the docking area 30. As seen in decision block 58, the computer processor 42 first determines whether the last skillet 16a and the new skillet 24 are within the docking area 30. This is determined by subtracting the position of the last skillet 16a from the position of the new skillet 24. If the difference is greater than the docking area 30, then the computer processor 42 continues to monitor the position of the skillets 16a, 24 until the skillets 16a, 24 are within the docking area 30. Once the skillets 16a, 24 are within the docking area 30, then the ramp can be calculated, as seen in block 60. The computer processor 42 utilizes the relative positions of the last skillet 16a and the new skillet 24 along with the first rate of speed of the last skillet 16a to determine the deceleration of the second rate of speed of the new skillet 24, as seen in block 62. The computer processor 42 provides a signal to the controller 14 which adjusts the variable drive 28 of the second conveyor 26, as seen in block 64. The speed of the new skillet 24 is continually reduced until the new skillet 24 becomes adjacently aligned with the last skillet 16a whereby the new skillet 24 will assume the same rate of speed as the last skillet 16a, as seen in block 66. The new skillet 24 is then integrated into the first conveyor 14, and the process is repeated by having yet another new skillet 24 introduced onto the second conveyor 26, as seen in block 68.

While the invention has been described in connection with what is presently considered to be the most practical and preferred embodiment, it is to be understood that the invention is not to be limited to those disclosed embodiments, but on the contrary, it is intended to cover various modifications and equivalent arrangements included within the spirit and scope of the appended claims which scope is intended to be accorded the broadest interpretation so as to encompass all such modifications and equivalent structures as is permitted under the law.

What is claimed is:

1. A method for integrating a pallet onto a conveyor, comprising the steps of:
providing a plurality of adjacently aligned pallets wherein said pallets are driven at a first rate of speed along a predetermined path of travel;
introducing a new pallet to said adjacently aligned pallets at a position spaced from the last pallet of said adjacently aligned pallets;
driving said new pallet at a second rate of speed;
monitoring the position of said new pallet relative to said position of said last pallet; and
adjusting the second rate of speed of said new pallet based on the relative position of said new pallet relative to said last pallet until said new pallet is traveling at said first rate of speed and is adjacently aligned with said last pallet within a predetermined docking area.

2. The method stated in claim 1, further comprising the steps of:
providing a first conveyor line for moving said adjacently aligned pallets along said predetermined path of travel.

3. The method stated in claim 2, further comprising the steps of:
providing a first motor coupled to said first conveyor for driving said adjacently aligned pallets at said first rate of speed.

4. The method stated in claim 3, further comprising the steps of:
providing an encoder coupled to said first motor to monitor the position of said last pallet of said adjacently aligned pallets.

5. The method stated in claim 1, further comprising the steps of:
providing a second conveyor line for moving said new pallet along a predetermined path of travel.

6. The method stated in claim 5, further comprising the steps of:
providing a second motor coupled to said second conveyor for driving said new pallet at said second rate of speed.

7. The method stated in claim 6, further comprising the steps of:
providing an encoder coupled to said second motor to monitor the position of said new pallet.

8. The method stated in claim 1, wherein said step for adjusting the second rate of speed of said new pallet further comprises the steps of:
calculating the relative position of the new pallet relative to the last pallet of the adjacently aligned pallets;
maintaining the second rate of speed of said new pallet at a predetermined upper level if the relative distance between the new pallet and said last pallet of said adjacently aligned pallets exceeds the distance of said predetermined docking area; and
adjusting the second rate of speed of said new pallet if the relative distance between said new pallet and said last pallet of said adjacently aligned pallets does not exceed said distance of said predetermined docking area.

9. The method stated in claim 8, wherein said step for adjusting the second rate of speed of said new pallet, further comprises the steps of:
calculating a deceleration ramp through the equation, RAMP=(FIRST RATE OF SPEED)−(SECOND RATE OF SPEED)/((POSITION OF SAID NEW PALLET)−(POSITION OF SAID LAST PALLET)).

10. The method stated in claim 9, further comprising the steps of:
calculating the speed of the new pallet through the equation, SECOND RATE OF SPEED=(RAMP (POSITION OF SAID NEW PALLET)−(POSITION OF SAID LAST PALLET))+(FIRST RATE OF SPEED).

11. The method stated in claim 10, further comprising the steps of:

continually adjusting the second rate of speed until the second rate of speed of the new pallet equals the first rate of speed of the last pallet and until the new pallet is adjacently aligned with the last pallet.

12. An apparatus for integrating a pallet onto a conveyor, comprising:

a first conveyor for carrying and driving at least one pallet at a first rate of speed;

a second conveyor for carrying and driving a new pallet at a second rate of speed;

means for monitoring the relative position of said new pallet relative to said at least one pallet;

a computer processor for determining said second rate of speed in order that said new pallet may become adjacently aligned with said at least one pallet within a predetermined docking area; and a controller for adjusting said second rate of speed in response to a signal from said computer processor.

13. The apparatus stated in claim 12, further comprising:

said first conveyor having a first motor for driving said at least one pallet at said first rate of speed; and said second conveyor having a second motor for driving said new pallet at said second rate of speed.

14. The apparatus stated in claim 13, wherein said monitoring means further comprises:

a first encoder coupled to said first motor for monitoring the position of said last pallet of said adjacently aligned pallets; and a second encoder coupled to said second motor for monitoring the position of said new pallet.

15. An apparatus for integrating a pallet onto a conveyor, comprising:

a first conveyor for carrying a plurality of adjacently aligned pallets along a predetermined path of travel;

a first motor coupled to said conveyor for driving said adjacently aligned pallets at a first rate of speed;

a first encoder coupled to said first motor for monitoring the position of said last pallet of said adjacently aligned pallets on said first conveyor;

a second conveyor for carrying and introducing a new pallet to said first conveyor;

a second motor coupled to said second conveyor for driving said new pallet at a second rate of speed;

a second encoder coupled to said second motor for monitoring the position of said new pallet;

a computer processor for determining the relative position of said last pallet of said adjacently aligned pallets relative to said new pallet and for determining said second rate of speed to adjacently align said new pallet with said last pallet within a predetermined docking area; and a controller for adjusting said second rate of speed of said second motor in response to a signal from said computer processor.

16. The apparatus stated in claim 5, further comprising:

a sensor adjacent said docking area for determining whether said new pallet is adjacently aligned with said last pallet when leaving said docking area.

17. The apparatus stated in claim 16, further comprising:

a fault indicator, in communication with said sensor, for indicating when said new pallet and said last pallet are not adjacently aligned when leaving said docking area.

\* \* \* \* \*